No. 795,787. PATENTED JULY 25, 1905.
J. H. CURRY.
FASTENER FOR GLASS PLATES IN STORE FRONTS AND SHOW CASES.
APPLICATION FILED APR. 9, 1904.
fig. 1.
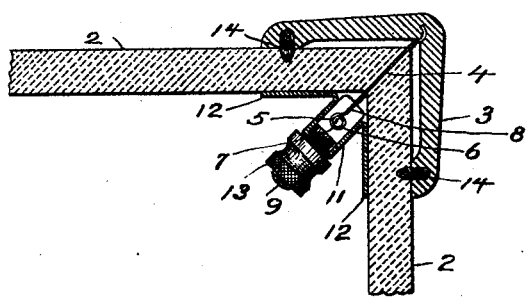
fig. 2.
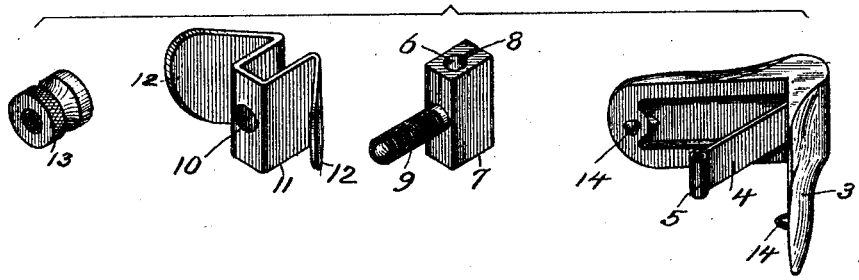
fig. 3.
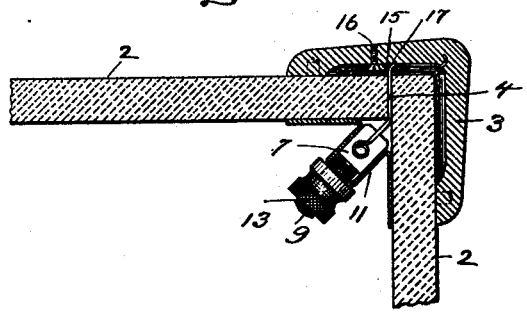
fig. 4.
WITNESSES:
INVENTOR:

UNITED STATES PATENT OFFICE.

JAMES H. CURRY, OF WILKINSBURG, PENNSYLVANIA, ASSIGNOR TO WILLIAM L. KANN, OF PITTSBURG, PENNSYLVANIA.

FASTENER FOR GLASS PLATES IN STORE-FRONTS AND SHOW-CASES.

No. 795,787. Specification of Letters Patent. Patented July 25, 1905.

Application filed April 9, 1904. Serial No. 202,370.

*To all whom it may concern:*

Be it known that I, JAMES H. CURRY, of Wilkinsburg, in the county of Allegheny and State of Pennsylvania, have invented a certain new and useful Improvement in Fasteners for Glass Plates in Store-Fronts and Show-Cases, of which the following is a full, clear, and exact description, reference being had to the accompanying drawings, forming part of this specification, in which—

Figure 1 is a horizontal sectional view of my improved fastener as applied to the corners of two plates of glass, the meeting edges of the glass being beveled, the tightening or securing nut of the fastener being shown in full lines. Fig. 2 shows perspective views of the different parts of the fastener separated from each other. Fig. 3 is a horizontal sectional view of a modification adapted to be used where the glass plates meet with a butt-joint, and Fig. 4 is a plan view of the adjustable slide by means of which the point of departure of the securing-strip may be adjusted.

Like symbols of reference indicate like parts wherever they occur.

My invention relates to an improvement in devices for securing plates of glass to each other; and it is especially adapted for use in show-windows and show-cases.

It consists in a fastener adapted to clamp the plates of glass to each other in such a manner that they shall be firmly held, forming a perfect joint, and yet so as to permit movement of one or the other of them, due to settling or expansion or other cause, without injury to them.

My improved fastener is also adapted to be used in fastening glass plates without the necessity of cutting holes through the glass.

I will now describe my invention, so that others skilled in the art may manufacture and use the same.

In the drawings, 2 2 represent the two plates of glass which it is desired to connect one with the other. The meeting edges of these plates may be beveled, as shown in Fig. 1, or the plates may be united by a butt-joint, as shown in Fig. 3. The fastener itself is composed of an outer corner-piece 3, formed of brass, aluminium, or other suitable material. The leaves of said corner-piece extend from each other at the angle the two plates of glass are to occupy. Extending from the inner side of the apex of the angle of the outer corner-piece is a strip of metal 4, preferably very thin and flexible and of a length greater than the width of the meeting edges of the plates of glass, this strip being adapted to pass between said edges. The inner end of this strip 4 is provided with an eye 5, the metal being preferably bent upon itself in the form of a cylinder. This eye is adapted to fit within a cylindrical cavity 6 in the metal block 7, said cavity 6 opening to the outer edge of the block by a slot 8, the purpose of which slot is to allow the passage of the straight portion of the strip 4, while the head or curved portion 5 fits within the cylindrical cavity 6, these parts being adapted to slide vertically within the cavities of the block 7 to allow of any movement of the plates 2 2, due to expansion, contraction, or settling. The other end of the strip 4 is firmly secured to the inner face of the corner-piece 3. Extending from the rear face of the block 7 is a threaded bolt 9, which is adapted to pass through an opening 10 in the body 11 of the inner corner-piece. This inner corner-piece is composed of the rectangular-shaped body 11, adapted to inclose the block 7, and two wings or leaves 12, which are adapted to bear against the inner faces of the plates of glass 2. A threaded thumb-nut 13 is adapted to screw on the projecting end of the bolt 9, so that by tightening the thumb-nut 13 the block 7 may be drawn back in the cavity of the body portion 11 of the inner corner-piece, said body portion being of greater depth than the thickness of the block, and thus pull on the strip 4, drawing the outer corner-piece 3 and the inner corner-piece 11 and 12 toward each other and tightly against the outer and inner faces of the glass, making a tight joint.

The ribbon or strip 4 may be made of any desired length or of a greater length than is ordinarily desired, so that the corner-piece may be fitted to glass of extra thickness. In such cases the ribbon is cut off at the desired point, and a head or eye 5 is formed in the end thereof by turning the ribbon over a suitable rod or mandrel, this head being formed at the time when the corner-piece is being fitted to the glass.

In the drawings I have shown studs or projections 14 on the inner faces of the leaves of the corner-piece 3, which are adapted to fit in shallow cavities formed in the outer face of the plates of glass. Instead of these studs and cavities the inner faces of the leaves of the outer corner-piece may be covered with leather, cloth, or other material, which may be secured to the metal of the corner-piece and glued to the surface of the glass, or other means of securing the corner-piece 3 to the surface of the glass may be employed.

Any number of these fastening devices may be used, according to the size and weight of the glass plates which are to be united with each other.

In Fig. 3 I show a modification of my improvement, in which the glass plates 2 2 instead of having their meeting edges beveled may have what is known as a "butt-joint"— that is, the edge of one plate butting against the face of the other plate—and in such case the strip 4 instead of extending from the corner-piece 3 in the straight line of the apex of the angle passes from the apex of the angle along the inner face of the strip to a sliding fastener 15, which is adjustably secured to the inner face of the corner-piece 3 by a screw 16, which passes through a slot 18 and is provided with a slot 17, through which the strip 4 passes directly and at right angles to the inner face of the leaf of the corner-piece, between the butting plates of glass, and thence the flexible strip projects on the inner side of the glass plates in a line with the apex of the angle of the corner-piece 3 and is secured by the block 7 and thumb-nut 13 in the manner already described. By means of the slide 15, which is adjustable, the strip 4 may be caused to project from the inner face of the corner-piece 3 at any desirable point, according to the thickness of the glass which it may be desired to fasten. As already described, the head 5 and also the body of the strip 4 are free to move up and down in the cavities 6 and 8, so that should the plates settle, or either of them, there is room for the movement of the outer corner-piece 3 in relation to the inner corner-piece 11 and 12.

The advantages of my invention will be appreciated by those skilled in the art.

My improved fastener may be used with plates of glass having equal thickness to the extent of the take-up provided for by the threaded thumb-nut 13, and this is a feature, so far as I know, peculiar to my invention.

Although I have described the use of studs fitting in recesses in the plates of glass, these studs are not essential, as the glass may be firmly held merely by the pressure of the corner-pieces. Where an absolutely-close joint is required, the glass may be filed away at the meeting edges of the plates at a point where the flexible strip passes between the edges of the plate, and the slide-recess thus formed need be equal only to the thickness of the strip and equal to the width thereof.

The fastener is simple in construction, and yet is strong and durable. It may be easily placed in position and removed. It is adapted to firmly secure the plates of glass in relation to each other and to hold them in position, and yet provision is allowed for contraction and expansion or settling of the glass, and it enables the glass to be held without perforating the glass plates and without cutting the glass at its meeting edges other than the usual bevel or filing of the edges the width of the flexible strip, which bevel may be dispensed with and the butt-joint employed, if desired, in the manner described.

Having thus described my invention, what I claim, and desire to secure by Letters Patent, is—

1. In a glass-plate fastener, the combination of inner and outer securing corner-pieces, a strip adapted to extend between the plates of glass, a securing-block adapted to receive and retain the end of the strip, said block fitting within the inner corner-piece, and a securing device for securing the block.

2. In a glass-plate fastener, the combination of inner and outer securing corner-pieces, a strip adapted to extend between the plates of glass and from the outer corner-piece to the inner corner-piece, said strip having a head on its inner end adapted to be secured in the inner corner-piece and to be capable of vertical movement a bolt having a part adapted to engage with the head of the strip, and a securing device.

3. In a glass-plate fastener, the combination of outer and inner corner-pieces, a strip adapted to extend between the plates of glass and from the outer corner-piece to the inner corner-piece, said strip having a head on its inner end, a block adapted to receive and retain the head of the strip, an inner corner-piece adapted to inclose and retain the block, and a tightening device adapted to tighten the block within the inner corner-piece.

4. In a glass-plate fastener, the combination of inner and outer securing corner-pieces, a strip adapted to extend between the plates of glass and from the outer corner-piece to the inner corner-piece, said strip having a head on its inner end, a block adapted to receive and retain the head of said strip, and a device for securing the block to the inner corner-piece; substantially as specified.

5. In a glass-plate fastener, the combination of inner and outer securing corner-pieces, a strip adapted to extend between the plates of glass, a securing-block adapted to receive and retain the end of the strip, said block fitting within the inner corner-piece, a threaded bolt, and a nut for adjusting the corner-pieces to plates of glass of unequal thickness.

6. In a glass-plate fastener, the combination of an inner and an outer securing-piece, a thin strip adapted to extend between the plates of glass and from the outer corner-piece to the inner corner-piece, said strip having a bent portion on its inner end, forming a head which is adapted to be secured in the inner corner-piece, a bolt adapted to engage with the head of the strip, and a securing device.

In testimony whereof I have hereunto set my hand.

JAMES H. CURRY.

Witnesses:
A. M. STEEN,
WALTER FAMARISS.